United States Patent [19]
Penrod

[11] 3,982,137
[45] Sept. 21, 1976

[54] ARC SUPPRESSOR CIRCUIT

[75] Inventor: John K. Penrod, Bellbrook, Ohio

[73] Assignee: Power Management Corporation, Dayton, Ohio

[22] Filed: Mar. 27, 1975

[21] Appl. No.: 562,809

[52] U.S. Cl. .......... 307/136; 317/11 E
[51] Int. Cl.² .......... H02H 7/22
[58] Field of Search .......... 307/136; 317/11 E, 11 A, 317/11 R, 33 SC

[56] References Cited

UNITED STATES PATENTS

| | | | |
|---|---|---|---|
| 3,474,293 | 10/1969 | Sinko et al. | 307/136 |
| 3,555,353 | 1/1971 | Casson | 317/11 E |
| 3,558,910 | 1/1971 | Dale | 317/11 E |

*Primary Examiner*—Herman Hohauser
*Attorney, Agent, or Firm*—Biebel, French & Nauman

[57] ABSTRACT

An arc suppressor circuit for a relay includes a semiconductor means connected in parallel with the current carrying primary contact points. Auxiliary contact point means supply a gate signal to the semiconductor means to cause it to short the primary contact points during the closing or opening of the primary contact points. The circuit further provides for opening the auxiliary contact point means after the primary contact points are closed to prevent the semiconductor means from carrying load current for any substantial period of time. The semiconductor means may include a triac or a pair of silicon controlled rectifiers arranged to conduct on alternate half cycles.

11 Claims, 9 Drawing Figures

ARC SUPPRESSOR CIRCUIT

BACKGROUND OF THE INVENTION

The present invention relates to a circuit for preventing arcing between current carrying contact points in a relay as the contact points are opened or closed. Such arcing may occur when relay contact points are opened or closed with a potential across them. Arcing not only causes undesirable radio interference as a result of radiation broadcast from the switch, but also severely limits the useful life of the relay contact. The contact points may be charred and contact resistance increased to the point where the relay will fail to operate satisfactorily.

A number of approaches have been taken to prevent arcing across relay contact points as the points are opened and closed. U.S. Pat. No. 3,736,466, for instance, discloses a circuit in which a triac semiconductor is placed in series with the power carrying contact points of a mechanical switch. The switch includes a second set of contact points which are connected to gate the triac off during the opening and closing of the power carrying contacts and thus eliminate arcing. One drawback to such a circuit is that the triac is in series with the power source and load and thus must have a sufficiently large continuous current rating to handle the current applied to the load.

In order to use a semiconductor having a smaller continuous current rating, several circuits have placed the semiconductor in parallel with the power carrying contact points of a relay switch. U.S. Pat. Nos. 3,558,910 and 3,555,353, as well as J. W. von Brimer, "Commutated Relay Combines Solid-state Switching," April 1965, 13th Annual National Relay Conference, page 14-1, show such circuits. The circuits disclosed in the two patents both use the current supplied to the relay coil to energize the gate terminal of a triac which is connected in parallel with the current carrying contact points of the relay. The von Brimer article, on the other hand, shows a relay having a primary set of contact points and an auxiliary set of contact points. The auxiliary contact points are closed first so that current is supplied to the gate of a triac causing it to become conductive prior to the closing of the primary current carrying contact points. These three circuits have the disadvantage that the triac in parallel with the current carrying contact points is maintained on as long as the current carrying contact points are closed. If the current carrying contact points have only negligible resistance, the triac will be effectively shorted while the primary contact points are closed and will therefore carry none of the load current. If, however, the contact points should develop appreciable resistance, the triac will be forced to carry a sizable current and may therefore be overloaded.

To prevent damage to the semiconductor in such a situation, it is necessary to allow the semiconductor to conduct for only a short time interval during the closing and opening of the primary relay contact points. One approach taken to accomplish this result is shown in U.S. Pat. No. 3,639,808. The circuit there disclosed uses a D.C. supply to energize the relay coil. A secondary coil is linked to the relay coil and connected to the gate of the triac so that the gate receives a signal only when the relay is being switched on or off. This has the advantage that a smaller triac may be used since it will not continue to conduct the load current if the relay contacts should fail to close or should develop appreciable contact resistance. Such a circuit, however, requires that a D.C. supply voltage be available for energization of the relay coil.

SUMMARY OF THE INVENTION

The present invention relates to a switching circuit which prevents arcing across primary contact points as these points are closed or opened. A semiconductor means has its power conducting terminals connected in parallel with the primary contact points. Auxiliary contact point means are connected to render the semiconductor means conductive when they are closed. An actuator means is provided for closing the auxiliary contact point means just prior to the closing or opening of the primary contact points and for opening the auxiliary contact point means just after the closing or opening of the primary contact points. Thus, the voltage across the primary contact points is reduced as they are opened or closed but the semiconductor means is not maintained continuously in a conductive state while primary contact points are closed.

Accordingly, it is an object of this invention to provide a switching arrangement for preventing arcing during the closing or opening of a switch such that the switch is only momentarily shorted by a semiconductor.

It is also an object of this invention to provide a switching arrangement for preventing arcing during the closing or opening of a switch by shunting the switch with a semiconductor in which the semiconductor is rendered conductive in response to the closing of auxiliary contact points and thereafter rendered nonconductive in response to the opening of the auxiliary contact points.

It is also an object of this invention to provide a switching arrangement for preventing arcing during the closing or opening of a switch such that the switch is only momentarily shorted by a semiconductor in which the circuit functions using only alternating current.

Other objects and advantages of the invention will be apparent from the following description, the accompanying drawings and the appended claims.

DESCRIPTION OF THE PREFERRED EMBODIMENT

Figure 1:
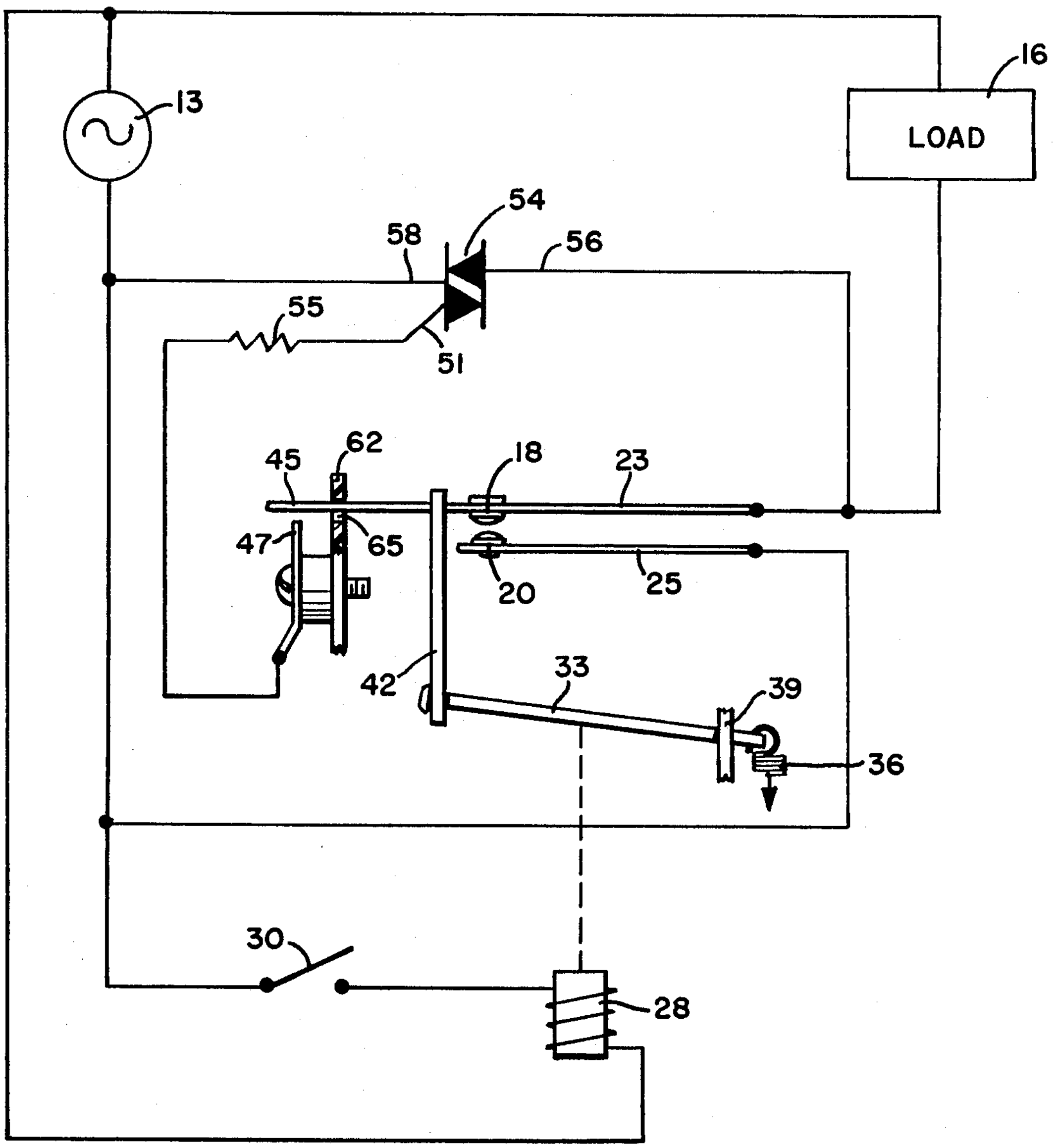
FIG. 1 is a schematic representation of the circuit of the preferred embodiment showing only a portion of the relay mechanism.

Referring to FIG. 1 of the drawings, there is shown a schematic representation of the preferred embodiment of the invention, including a portion of the relay mechanism. A source of power 13 is to be connected to load 16 by way of a first primary contact point or tip 18 and a second primary contact point or tip 20 which are mounted on a first contact bar or blade 23 and a second contact bar or blade 25, respectively. An actuator means for moving points 18 and 20 into contact includes a relay coil 28 which is energized by the closing of relay coil switch 30. Energization of coil 28 results in the movement of relay armature means 33 towards the relay coil 28. This movement is resisted by a counteracting spring force applied by spring 36 about a pivot 39. Movement of the relay armature means 33 results in the movement of an insulated linkage means 42 which engages the first contact bar 23.

A first and second auxiliary contact point means includes first auxiliary contact point or tip 45 disposed on the first contact bar 23 and a second auxiliary contact point or tip 47 connected to the gate terminal means 51 of semiconductor means 54 which includes impedance 55. Semiconductor means 54 has first and second power conducting terminals 56 and 58 and may typically comprise a triac semiconductor.

Referring now to FIGS. 2 through 5, the relay of the present invention is depicted in positions successively assumed during a closing operation. The first and second contact bars or blades are mounted upon a first insulated support means 60. The contact bars may typically be made of a conductive metal so that they can flex during operation of the relay. A second insulated support means 62 is provided for mounting the second auxiliary contact point 47. The first contact bar 23 passes through an opening 65 (FIG. 6) in insulated support means 62. The opening is positioned such that, as the auxiliary contact points close, the first contact blade will impinge upon the edge of the opening 65.

Figure 2:
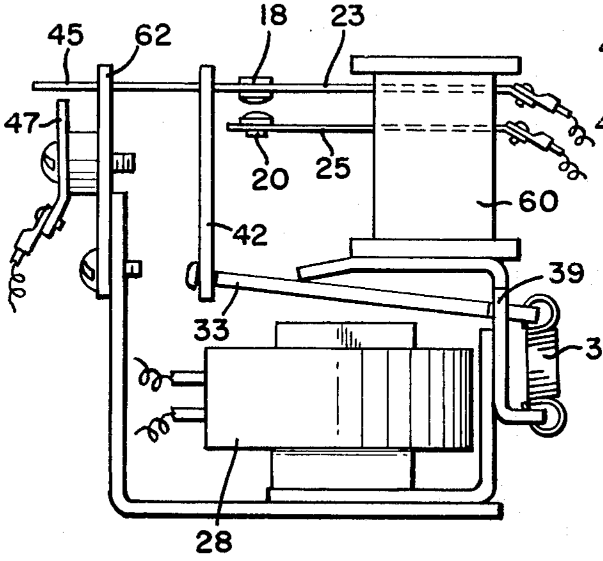
FIGS. 2, 3, 4, and 5, illustrate the movement of the relay mechanism during closure of the contact points.
Figure 3:
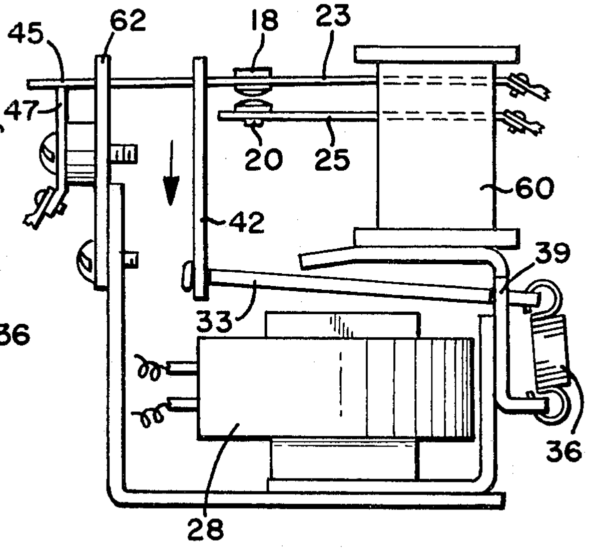
Figure 4:
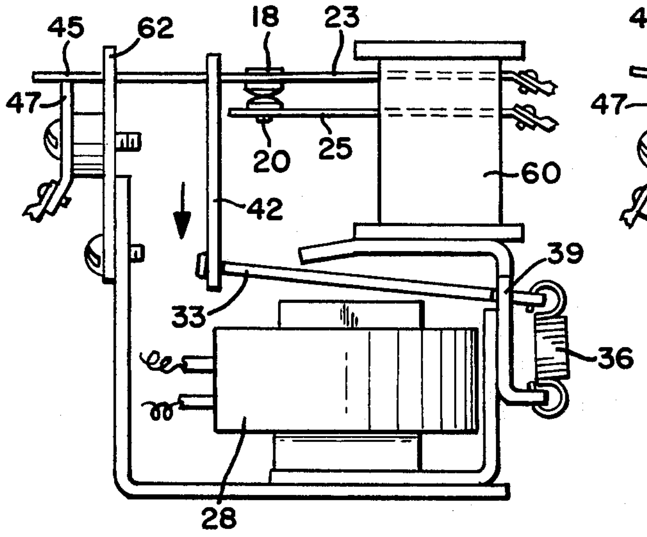
Figure 5:
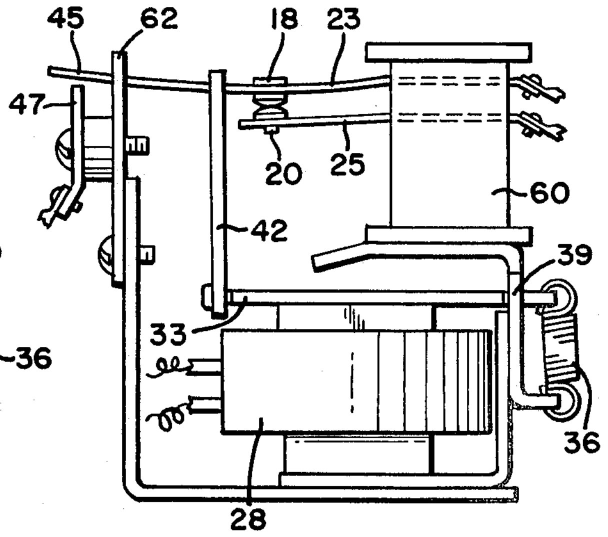
Figure 6:
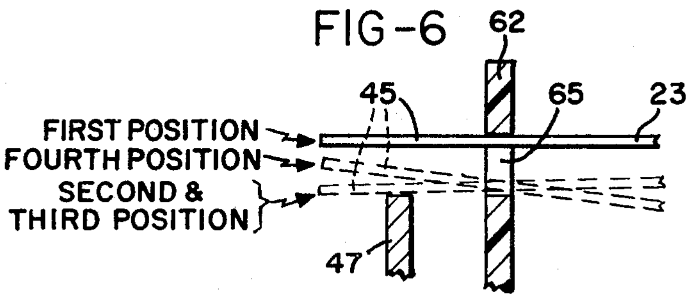
FIG. 6 is a section of part of the relay shown in FIGS. 2 through 5.

The sequence of steps occurring during actuation of the relay is as follows. In FIG. 2, the relay armature means 33 is spring biased to an initial position and the contact bars 23 and 25 are positioned such that the contact points 18, 20, 45, and 47 are completely opened. After relay coil 28 is energized, the relay armature means 33 is drawn downward against the biasing force of spring 36. This causes insulated linkage means 42 to move the first contact bar 23 into a second position shown in FIG. 3 in which the auxiliary contact points 45 and 47 are closed. Thereafter the first contact bar 23 is moved even further by insulated linkage means 42 into a third position shown in FIG. 4 in which both the primary contact points 18 and 20 and the auxiliary contact points 45 and 47 are closed. As the relay armature means 33 moves to its final position, the primary contact points assume a final, completely closed position. The auxiliary contact points in this fourth position, however, are opened as a result of the flexure caused by the first contact bar 23 impinging upon the edge of opening 65 in the second insulated support means 62. This fourth position is illustrated in FIGS. 5 and 6. The sequence which occurs upon the opening of the primary contact points is the reverse of that discussed above. That is, the auxiliary contact points close prior to the opening of the primary contact points and remain closed until after the primary contact points have opened completely.

Referring again to FIG. 1, it is seen that the sequence of operations discussed above provides for switching with arc suppression. When switch 30 is closed, relay armature means 33 will move insulated linkage means 42 downwardly, causing the closure of auxiliary contact points 45 and 47. Triac 54 will therefore be switched on as current is applied through the auxiliary contact points to gate terminal 51. At this point, the current will begin to flow from the source of power 14 through the load 16 and the triac 54. The voltage across the triac will be minimal and thus the primary contact points 18 and 20 will be effectively shorted. These contact points are then closed and no arcing will occur. The triac 54 and the primary contact points 18 and 20 will then be connected in parallel and, if the contact points present only a minimal resistance, they will shunt the load current around the triac. Since, however, the contact points may develop some resistance due to oxidation or dirt on the contact points, the final position which the relay assumes is one in which auxiliary contact points 45 and 46 are opened. This removes the gate signal from gate terminal 51 with the result that as the A.C. output of power source 13 passes through a null, the triac will be switched off. Thus, even if the primary contact points have developed a high resistance, the triac will not be forced to carry current for any appreciable period. With full voltage now on the contacts, fretting action may take place to clear the contacts so they may thereafter carry the full load. The triac 54 therefore may be a smaller device than would be required if the triac were to remain on while the primary contact points are closed, and the entire device less expensive, since heat sinks and the like are not required.

When switch 30 is opened and the primary contact points 18 and 20 are to be opened, the circuit goes through the steps discussed above in reverse order. The auxiliary contact points close, shunting the primary contact points by switching on the triac 54 and the primary contact points are thereafter opened. After this occurs, the auxiliary contact points are opened, switching off the triac and effectively disconnecting load 16 from the source of power 13.

Figure 7:
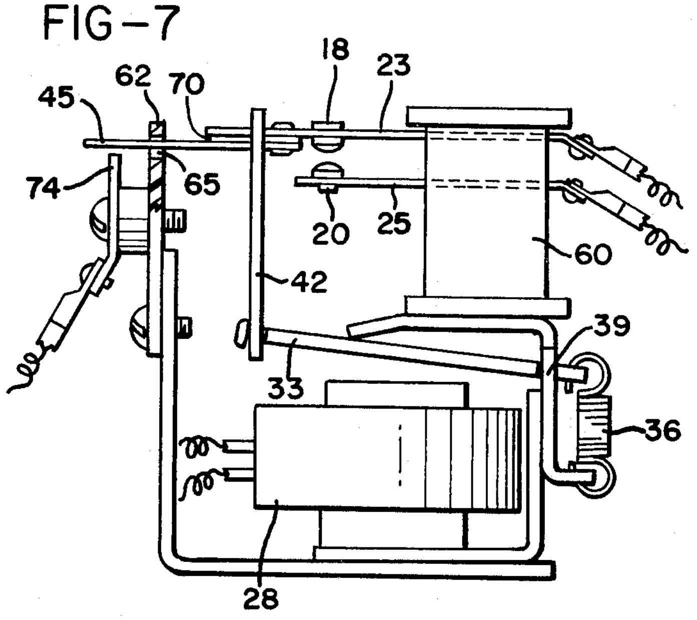
FIG. 7 shows a modified relay used in an alternative embodiment of the invention.
Figure 8:
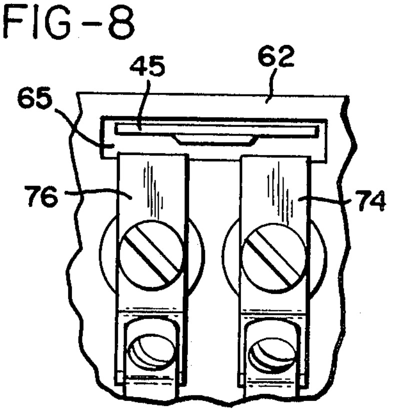
FIG. 8 is a partial view of the relay of FIG. 7 as seen looking from left to right in FIG. 7.
Figure 9:
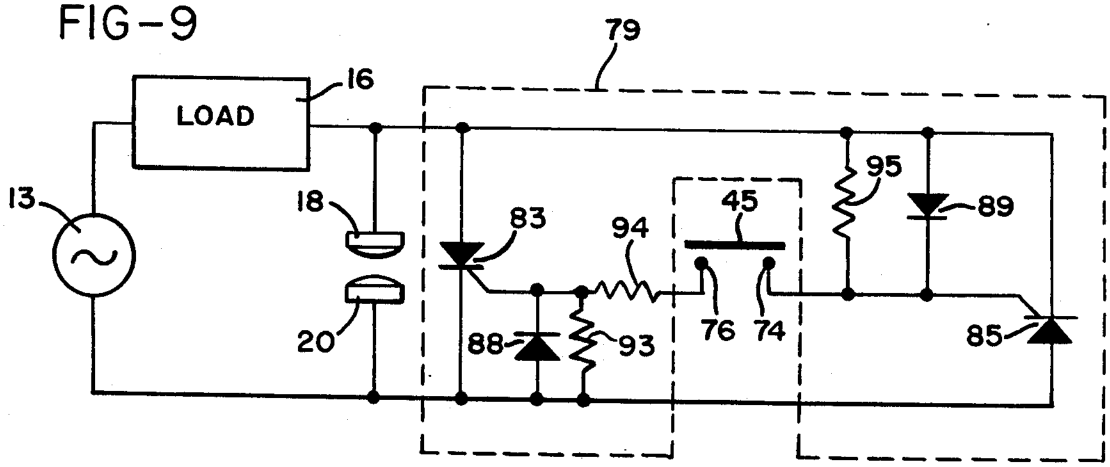
FIG. 9 is a schematic representation of the alternative embodiment.

Referring now to FIGS. 7 through 9 there is shown an alternative embodiment of the instant invention in which elements identical to those shown in FIGS. 1 through 6 are given like reference numerals. A modified relay arrangement is shown in FIG. 7 in which the first auxiliary contact point 45 is electrically insulated from the primary contact points 18 and 20 by means of insulator 70. The auxiliary contact point means includes two second auxiliary contact points 74 and 76 (FIG. 8) which are mounted so as to be electrically insulated from each other. The contact closing sequence of this embodiment is identical with that described in regard to the first embodiment of the invention. That is, the auxiliary contact points close prior to the closing or opening of the primary contact points, and thereafter open. Thus the two second auxiliary contact points 76 and 74 will be electrically connected by the first auxiliary contact point 45 just prior to the closing or opening of primary contact points 18 and 20. After primary contact points 18 and 20 have been closed or opened without arcing, the second auxiliary contact points 74 and 76 will be opened.

FIG. 9 shows a circuit which may be used to prevent arcing with this embodiment. Primary contacts 18 and 20 are shunted by semiconductor means 79 in the response to the connection of auxiliary contact points 74 and 76 by auxiliary contact point 45. Two silicon controlled rectifiers 83 and 85 are gated to conduct on alternate half cycles of the source of power 13. Diodes 88 and 89 act on alternate half cycles to shunt the gate and cathode terminals of the silicon controlled rectifiers. While the circuit arrangement shown in FIG. 1 may be capable of switching 800 volts with a 1 cycle current surge of 350 amps, the circuit arrangement shown in FIG. 9 may typically be able to switch 2400 volts with a one cycle surge current of 14,000 amps. Also, SCR's are more tolerant of inductive loads than triacs.

It should be understood that numerous modifications may be made to the preferred embodiments of the invention. For instance, while the semiconductor means used to temporarily shunt the primary contact points has been shown as being energized by the same source applying power to the load, it should be understood that a separate source of power can be used to gate the semiconductor means on and off. Likewise, a separate source of power may be utilized for the relay coil. Further, it is clear that the instant invention may be used with a switch actuable by means other than a relay.

While the method herein described, and the form of apparatus for carrying this method into effect, constitute preferred embodiments of the invention, it is to be understood that the invention is not limited to this precise method and form of apparatus, and that changes may be made in either without departing from the scope of the invention as defined in the appended claims.

What is claimed is:

1. In a switching circuit comprising current carrying primary contact points and auxiliary contact points means, semiconductor means having power conducting terminals connected across said primary contact points and gate terminal means connected to said auxiliary contact point means for providing gating signals to said semiconductor means, the method of closing said primary contact points while power is applied without arcing by temporarily providing gating signals to said semiconductor means comprising the steps of:

first closing said auxiliary contact point means to provide gating signals to said semiconductor means, closing said primary contact points, and thereafter opening said auxiliary contact point means while said primary contact points are closed to remove said gating signals so that said semiconductor means does not continue conducting current thereby to protect said semiconductor means from carrying current to the load continuously should said primary contact points fail to close or close with an appreciable resistance therebetween.

2. A switching circuit for closing current carrying contact points while power is applied to said contact points without arcing comprising:

current carrying primary contact points, auxiliary contact points, semiconductor means, having power conducting terminals connected across said primary contact points and a gate terminal, for connecting said power conducting terminals in response to a signal on said gate terminal, said gate terminal connected to one of said auxiliary contact points and a gate energizing signal applied to the other of said auxiliary contact points, and actuator means for closing and auxiliary contact points just prior to either the closing or opening of said primary contact points and for opening said auxiliary contact points just after either the closing or opening of said primary contact points, whereby the potential across said primary contact points is momentarily reduced to prevent arcing during opening or closing and whereby said gate energizing signal is not maintained when said primary contact points are closed thereby protecting said semiconductor means against overload in the event said current carrying contact points should develop an appreciable contact resistance or fail to close.

3. A circuit arrangement to connect a source of power to a load comprising:

first and second primary contact points connected in series with said source of power and said load, gate controlled thyristor means connected in parallel with said first and second primary contact points, first and second auxiliary contact point means connected to the gate electrode of said gate controlled thyristor means for providing gating signals thereto, and, actuator means for closing said auxiliary contact point means prior to either the closing or opening of said primary contact points and thereafter opening said auxiliary contact point means, whereby said gate controlled thyristor means receives a gating signal from a time just prior to either the opening or closing of said primary contact points until a time just after either the opening or closing of said primary contact points to prevent a voltage across said primary contact points sufficient to cause significant arcing during either the opening or closing of said primary contact points to protect said gate controlled thyristor from being overloaded should said primary contact points fail to close or close with an appreciable resistance therebetween.

4. The circuit arrangement of claim 3 wherein said first and second auxiliary contact point means comprise first and second auxiliary contact points.

5. The circuit arrangement of claim 3 further comprising:

a first contact bar, upon which are mounted said first primary contact point and said first auxiliary contact points, a second contact bar, upon which is mounted said second primary contact point, first insulated support means for mounting said first contact bar and said second contact bar, and second insulated support means for mounting said second auxiliary contact point in fixed relation to said first insulated support means.

6. A circuit arrangement to connect a source of power to a load comprising:

first and second primary contact points connected in series with said source of power and said load, semiconductor means, having first and second power conducting terminals connected in parallel with said first and second primary contact points, and further having gate terminal means, first and second auxiliary contact point means connected to said gate terminal means for energizing said gate terminal means when closed, a first contact bar upon which is mounted said first primary contact point and said first auxiliary contact points, a second contact bar upon which is mounted said second primary contact point, first insulated support means for mounting said first contact bar and said second contact bar, second insulated support means for mounting said second auxiliary contact point in fixed relation to said first insulated support means, and actuator means for closing said auxiliary contact point means prior to either the closing and sopening of said primary contact points and thereafter opening said auxiliary contact point means, said actuator means comprising:

a relay coil, means for energizing said relay coil, a relay coil switch for connecting said relay coil to said means for energizing said relay coil, relay armature means, spring biased to an initial position, for moving to a final position in response to the energization of said relay coil, and insulated linkage means, fastened to said relay armature means, for engaging and moving said first contact bar from a completely open position in which said primary contact points are open to a completely closed position in which said primary contact points are closed as said relay armature moves from said initial position to said final position, whereby said semiconductor means receives a gating signal from a time just prior to the opening and closing of said primary contact points until a time just after the opening and closing of said primary contact points such that the voltage across said primary contact points is insufficient to cause significant arcing during the opening and closing of said primary contact points and whereby said semiconductor is protected from being overloaded should said primary contact points fail to close or close with an appreciable resistance therebetween.

7. The circuit arrangement of claim 6 wherein said second insulated support means is positioned between said primary contact points and said auxiliary contact points such that as said first contact bar is moved from said completely open position to said completely closed position, said auxiliary contact points close before said primary contact points close and further wherein said insulated linkage means moves said first contact bar into contact with said second insulated support means causing said first contact bar to flex and therefore opening said auxiliary contact points after said primary contact points are closed.

8. The circuit arrangement of claim 7 wherein as said first contact bar is moved from said completely closed position to said completely open position, said auxiliary contact points are closed before said primary contacts are opened and said auxiliary contact points opened only after said primary contact points open.

9. The circuit of claim 3 in which said first and second auxiliary contact point means comprises a first auxiliary contact point electrically insulated from said first primary contact point and two second auxiliary contact points insulated from each other.

10. A relay actuated switch comprising:

first and second electrically conductive contact blades, first insulated support means for mounting said first and second contact blades, a first primary contact tip on said first contact blade, a second primary contact tip on said second contact blade, a first auxiliary contact tip on said first contact blade electrically connected to said first primary contact tip, a second auxiliary contact tip, second insulated support means positioned between said auxiliary contact tips and said primary contact tips for mounting said second auxiliary contact tip, said second insulated support means having an opening through which said first contact blade extends, and actuator means, engaging said first contact blade intermediate said first primary contact tip and said second insulated support means, for moving said first contact blade from a first position in which said primary contact tips are open, through a second position in which said auxiliary tips are closed and a third position in which both said auxiliary tips and said primary tips are closed, to a fourth position in which said first contact blade impinges upon an edge of said opening, bending said first contact blade and causing said auxiliary contacts to open while allowing said primary contacts to remain closed.

11. The circuit arrangement of claim 3 wherein said source of power is an alternating current power source and wherein said gate controlled thyristor means is a triac.

* * * * *